United States Patent [19]

Stedman

[11] 3,984,776
[45] Oct. 5, 1976

[54] SIGNAL QUALITY DETECTOR

[75] Inventor: Robert Bruce Stedman, Algonquin, Ill.

[73] Assignee: Motorola, Inc., Schaumburg, Ill.

[22] Filed: Nov. 19, 1975

[21] Appl. No.: 633,209

[52] U.S. Cl. .............................. 325/305; 325/302; 325/304; 325/478
[51] Int. Cl.² .......................................... H04B 1/10
[58] Field of Search ........... 325/302, 304, 305, 474, 325/478, 480, 473, 477

[56] References Cited
UNITED STATES PATENTS
3,305,781  2/1967  Robinson ........................... 340/305

Primary Examiner—Harold I. Pitts
Attorney, Agent, or Firm—James W. Gillman; Eugene A. Parsons; Sang Ki Lee

[57] ABSTRACT

An FM radio receiver with a discriminator having the output connected to a first bandpass filter, tuned to a frequency above the audio but within the bandpass of the discriminator, and to a second bandpass filter tuned to a frequency above the audio, within the bandpass of the discriminator and adjacent the bandpass of the first filter. The outputs of the two bandpass filters are connected to a selector circuit for selecting, as an indication of the strength of signals being received by the radio receiver, the output having the lowest amplitude signal thereon.

7 Claims, 4 Drawing Figures

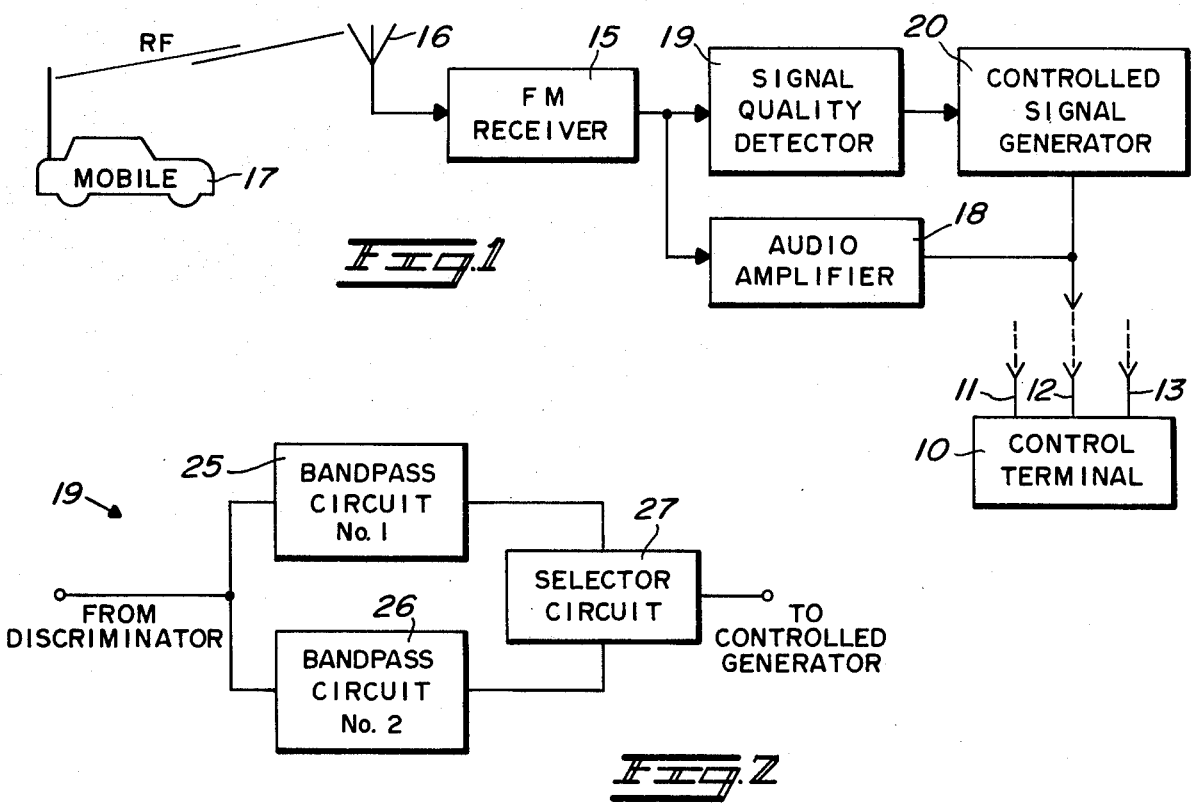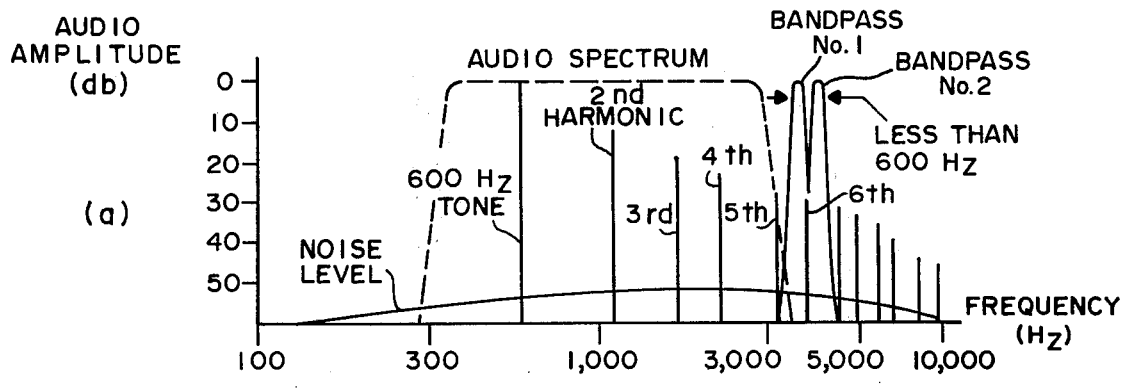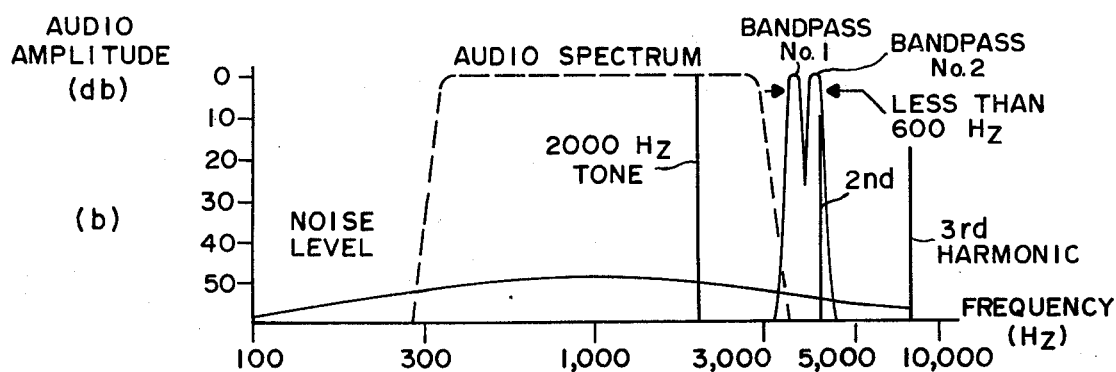

SIGNAL QUALITY DETECTOR

BACKGROUND OF THE INVENTION

In FM systems, it is well known that the noise at the output of a discriminator is inversely proportional to the signal. That is, with no signal, or very low signal, the discriminator output is substantially all noise. As the strength of the signal increases the noise output from the discriminator is reduced. This phenomenon is utilized in many quieting or squelch systems as well as in many voting systems (a system incorporating a plurality of receivers and wherein the receiver providing the strongest signal is utilized).

In the prior art a great variety of signal strength or quality detectors are provided, most of which provide a direct indication of the amplitude of the noise at the output of the discriminator or in some way compare the noise to the audio at the output of the discriminator. The bandwidth of the discriminator is generally equal to the width of the communications channel (i.e. 10 kHz) while the audio spectrum is generally substantially smaller (i.e. 300 to 3000 kHz). Thus, there is substantial bandwidth above the audio spectrum to measure the amplitude of the noise and determine the strength of the signal being received, if any.

In systems wherein the audio being transmitted is voice signals the noise above the audio spectrum is a relatively reliable indication of signal strength. However, in tone signalling systems harmonics of the tones are prevalent throughout the bandwidth of the discriminator and the harmonic of a particular tone can appear at the exact point at which the noise is being measured so that the measurement will not be a direct indication of signal strength or quality.

SUMMARY OF THE INVENTION

The present invention pertains to signal quality detector means including a pair of bandpass filters connected to the output of the discriminator in a radio receiver, with the bandpass filters passing adjacent bands of frequencies within the bandpass of the discriminator but outside of the band of audio signals passed by the discriminator and the outputs of the bandpass filters are applied to a selector circuit which selects the output having the lowest amplitude signal thereon.

In a tone signalling system the two bandpass filters are designed so that the total bandwidth thereof is less than the lowest frequency tone being utilized. For example, if a 600 Hz tone is the lowest tone being utilized the total bandwidth of the two bandpass filters is less than 600 Hz. Then the harmonics of any tone being utilized in the system can appear in only one of the outputs of the two bandpass filters at any time so that the other output contains only noise and is a direct indication of the quality or strength of the signal being transmitted.

It is an object of the present invention to provide a new and improved signal quality detector.

It is a further object of the present invention to provide a new and improved signal quality detector for tone signalling systems which is unaffected by harmonics of the tones.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a block diagram of a voting system utilizing an embodiment of the present signal quality detector;

FIG. 2 is a block diagram of an embodiment of the present signal quality detector;

FIG. 3 graphically displays the bandpass of the two filters with two different tones applied to the system.

DESCRIPTION OF THE PREFERRED EMBODIMENT

Figure 4:
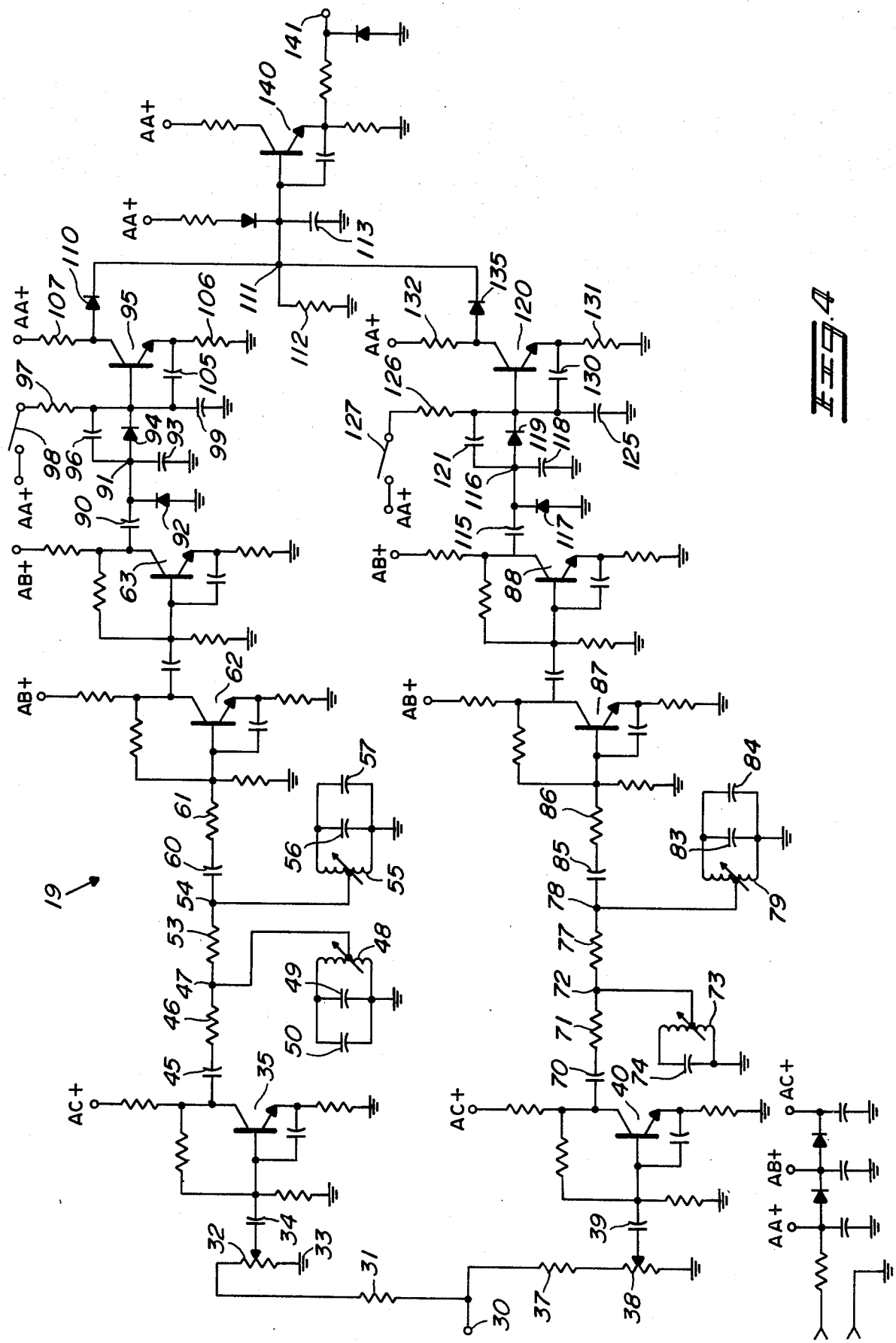
FIG. 4 is a schematic diagram of the apparatus illustrated in block form in FIG. 2.

Referring specifically to FIG. 1, a multireceiver system, commonly referred to as a voting system, is illustrated wherein a centrally located control terminal 10 has a plurality of radio receivers connected thereto by way of telephone lines 11, 12, 13, etc. In FIG. 1, only one radio receiver is illustrated since all of the remaining receivers are duplicates thereof. The control terminal 10 receives an audio signal and a quality signal from each of the receivers and then selects the receiver having the strongest input signal. A system of this type is disclosed in the copending patent application entitled "Receiver Voting System", Ser. No. 604,562, filed Aug. 14, 1975 and assigned to the same assignee.

In the system of FIG. 1, an FM receiver 15 having an antenna 16 for receiving radio frequency signals from a mobile radio 17 supplies audio signals from a discriminator to an audio amplifier 18 and a signal quality detector 19. The audio amplifier 18 applies the audio directly to the telephone line 12 and the signal quality detector 19 provides a DC control signal which is applied to a controlled signal generator 20. The signal generator 20 supplies a signal on the line 12 which is an indication of the quality of the signal being received by the receiver 15 in response to the DC control signals applied thereto. In general, telephone lines will not carry DC signals. However, certain users of this type of system do have access to telephone lines with DC continuity (i.e. Bell Telephone Company and other Radio Common Carriers). In the present system the signal generator 20 converts the DC control signal to proportional DC currents which are applied to the telephone lines. It should be understood that the signal generator 20 could convert the DC control signals to an AC signal which can be carried by the telephone line 12. Generally a portion of the audio from the audio amplifier 18 will be notched out and the quality signal from the signal generator 20 will be superimposed within the notch so that the two signals may be sent simultaneously without interference therebetween. U.S. Pat. No. 3,824,470, entitled "Communications System and Method for Transmitting Over a Limited Bandwidth Transmission Link", and assigned to the same assignee, may be referred to for further information on the transmission of audio and quality signals simultaneously over telephone lines.

FIG. 2 is a block diagram of an embodiment of the new and improved signal quality detector 19. In the block diagram of FIG. 2, the signal from the discriminator of the receiver 15 is applied to a first bandpass filter 25 and to a second bandpass filter 26. The outputs of the first and second bandpass filters 25 and 26 are supplied to a selector circuit 27 which selects the lowest amplitude signal from the outputs connected thereto. The output signal of the selector circuit 27 is the DC control signal which is applied to the controlled signal generator 20. The bandpass filters 25 and 26 are tuned so that the bands of frequencies passed thereby are adjacent and within the bandpass of the discriminator of receiver 15, while not within the audio spectrum. In general, since the telephone lines 11, 12, 13, etc. have a bandpass of approximately 300 to 3000 Hz, the audio spectrum of the receiver 15 is also limited to approximately 300 to 3000 Hz. However, the communications channel on which the receiver 15 receives the signal will generally have a bandwidth of approximately 10 kHz and the bandpass of the discriminator is approximately equal to the bandwidth of the channel. In the present embodiment the bandpass filters 25 and 26 are tuned to pass adjacent bands of frequencies which lie generally between 3 and 5 kHz. Referring to FIG. 3, graph A or graph B, the relationship of the band of frequencies passed by bandpass filters 25 and 26 (labelled Bandpass No. 1. and Bandpass No. 2, respectively) to each other and to the audio spectrum is illustrated.

In general, the present signal quality detector 19 is especially useful in tone signalling systems and simultaneous voice and tone signalling systems. In such systems, the bandpass filters 25 and 26 are designed so that the total bandpass thereof is less than the lowest tone utilized in the system. For example, graph A of FIG. 3 illustrates the positions of a 600 Hz tone and the various harmonics thereof relative to the audio spectrum and the bandpass of the bandpass filters 25 and 26. In this particular embodiment, 600 Hz is the lowest tone transmitted and, consequently, the total bandpass of the bandpass filters 25 and 26 is less than 600 Hz. Therefore, as illustrated in FIG. 3, the sixth harmonic of the 600 Hz tone falls within the bandpass of filter 25 (Bandpass No. 1) but no harmonic falls within the bandpass of filter 26 (Bandpass No. 2). Therefore, the selector circuit 27 would select the output of filter 26 when a 600 Hz tone is being received. In a similar fashion, referring to graph B of FIG. 3, when a 2000 Hz tone is being transmitted the second harmonic thereof falls within the bandpass of the filter 26 and, consequently, the output of filter 25 would be selected by the selector circuit 27. It will be noted that as long as the total bandpass of the filters 25 and 26 is less than the lowest tone transmitted, a harmonic of any single tone can be present in only one bandpass at any one time. Therefore, the output not having a harmonic of the received tone therein has only noise and is, therefore, an indication of the strength or quality of the signal being received by the receiver 15.

Referring to FIG. 4, the audio signals and noise from the discriminator of receiver 15 are applied to the input of the signal quality detector 19 at input terminal 30. A first resistor 31 is connected in series with the resistance element of a potentiometer 32 to a reference potential, such as ground 33. The potentiometer 32 serves as a level adjustment and the signal is taken from the movable tap and applied through a coupling capacitor 34 to the base of an NPN type transistor 35. The transistor 35 and its associated components, the connection of which is well known to those skilled in the art and will not be described in detail herein, form a voltage amplifier.

In a similar fashion, a resistor 37 is connected in series with the resistive element of a potentiometer 38 to ground 33 and the signal is taken from the movable tap of the potentiometer 38 and applied through a coupling capacitor 39 to the base of an NPN type transistor 40. Transistor 40 and its associated components form a voltage amplifier similar to transistor 35 and its associated components. The transistor 35, potentiometer 32 and the associated components form a means for coupling the signal to the first bandpass filter 25 and the transistor 40, potentiometer 38 and the associated circuitry form a means for coupling the signal to the second bandpass filter 26. The potentiometers 32 and 38 operate as level adjustments and insure the application of equal amounts of signal to each of the bandpass filters 25 and 26 even though the various components in the two parallel circuits are not matched.

The signal at the collector of the transistor 35 is coupled through a capacitor 45 and series resistor 46 to a terminal 47. A first tuned circuit including an adjustable coil 48 and parallel connected capacitors 49 and 50 is connected between the terminal 47 and ground 33. A resistor 53 connects the terminal 47 to a second terminal 54 which has connected therefrom to ground a second tuned circuit including an adjustable coil 55 with parallel connected capacitors 56 and 57. The terminal 54 is coupled through a capacitor 60 and series resistor 61 to the base of an NPN type transistor 62. The collector of the transistor 62 is coupled to the base of an NPN type transistor 63 which, in conjunction with the transistor 62 and the associated circuitry forms a two stage amplifier. In the present embodiment the first and second tuned circuits form the first bandpass filter 25 and will generally be tuned to form a single peak or bandpass as illustrated in graphs A and B of FIG. 3.

The signal at the collector of transistor 40 is coupled through a capacitor 70 and series connected resistor 71 to a first terminal 72 having a first tuned circuit, including an adjustable coil 73 and parallel connected capacitors 74, connected therefrom to ground. The terminal 72 is connected through a resistor 77 to a second terminal 78 having a second tuned circuit, including an adjustable coil 79 and parallel connected capacitors 83 and 84, connected therefrom to ground. The second terminal 78 is coupled through a capacitor 85 and series connected resistor 86 to the base of an NPN type transistor 87. The collector of the transistor 87 is coupled to the base of a second NPN type transistor 88. The transistors 87 and 88 and their associated components form a two stage amplifier similar to the two stage amplifier formed by the transistors 62 and 63 and their associated components. The first and second tuned circuits connected to the terminals 72 and 78 form the second bandpass filter 26 and both tuned circuits are generally tuned to a single peak adjacent and above the peak of the bandpass filter 25, as illustrated in graphs A and B of FIG. 3.

The signal from the two stage amplifier is coupled from the collector of the transistor 63 through a capacitor 90 to a junction 91. The cathode of a diode 92 is connected to the junction 91 and the anode is connected to ground 33. A capacitor 93 is connected in parallel with the diode 92. A second diode 94 has an anode connected to the junction 91 and a cathode connected to the base of an NPN type transistor 95. A capacitor 96 is connected in parallel with the diode 94. A resistor 97 and single pole switch 98 are connected from the base of the transistor 95 to a positive source of voltage designated AA+. A capacitor 99 is connected from the base of the transistor 95 to ground. The diodes 92 and 94 and their associated circuitry form a peak detector which allows the capacitor 99 to charge to the positive peaks of the incoming signal. As the noise of the channel increases the charge on the capacitor 99 increases making the base of the transistor 95 more positive.

A capacitor 105 is connected from the base of the transistor 95 to the emitter thereof. The emitter of the transistor 95 is also connected through a resistor 106 to ground and the collector is connected through a resistor 107 to the positive voltage terminal AA+. The transistor 107 is connected so that an increase in the charge stored in capacitor 99 increases the conduction of the transistor 95 and decreases the voltage at the collector thereof. The collector of the transistor 95 is connected to the anode of a diode 110, the cathode of which is connected to a terminal 111. The terminal 111 is connected to ground through a large resistor 112 and a parallel capacitor 113.

The signal at the collector of the transistor 88 is coupled through a capacitor 115 to a terminal 116. The terminal 116 is connected to the cathode of a diode 117, the anode of which is connected to ground and a capacitor 118 is connected in parallel therewith. The anode of a second diode 119 is connected to the terminal 116 and the cathode is connected to the base of an NPN type transistor 120. A capacitor 121 is connected in parallel with the diode 119. A storage capacitor 125 is connected from the base of the transistor 120 to ground. A series connected resistor 126 and single pole switch 127 connect the base of the transistor 120 to the positive voltage terminal AA+. A capacitor 130 is connected from the base of the transistor 120 to the emitter thereof. The emitter of the transistor 120 is also connected to ground through a resistor 131 and the collector is connected to the positive voltage AA+ through a resistor 132. The anode of a diode 135 is connected to the collector of the transistor 120 and the cathode is connected to the terminal 111. The diodes 117 and 119 and their associated circuitry form a peak detector which allows the capacitor 125 to charge to the positive voltage peaks of the input signal. The transistor 120 is biased so that an increase in signal applied to the peak detector increases the conduction thereof and decreases the voltage at the collector.

The charge on the capacitor 113 is determined by the conduction of the transistors 95 and 120. When either of the peak detectors detect sufficient noise to cause conduction of transistors 95 and/or 120 the charge on capacitor 113 begins to decrease. As the noise in the channel increases the conduction of transistors 95 and/or 120 increases and the charge on the capacitor 113 decreases. If a harmonic of a transmitted tone appears in the bandpass of either bandpass filter 25 or bandpass filter 26 the transistor 95 or 120, respectively, turns on heavily and the diode 110 or 135, respectively, is reversed biased so that the signal from the other bandpass filter (the transistor 95 or 120 which is not saturated) controls the charge on the capacitor 113 and, hence, the output voltage. The terminal 111 is connected to the base of an NPN type transistor 140 which, along with the associated components, forms a DC amplifier. The peak detectors, transistors 95 and 120 and their associated circuitry, and diodes 110 and 135 form the selector circuit 127. The DC control voltage from the selector circuit 27 is taken from the emitter of the transistor 140 at the output terminal 141.

Thus, a signal quality detector is described which provides a DC output signal indicative of the strength or quality of signals applied to the input of the receiver attached thereto. This DC control signal available at the output can be utilized as a quieting signal for muting the receiver. In addition, or in lieu thereof, this control signal can be applied to a centrally located control terminal of a voting system to indicate to the voting system which receiver is receiving the strongest signal.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Signal quality detector means for a radio receiver designed to pass a predetermined band of audio signals, said detector means comprising:
   a. discriminator means having an output and a bandpass substantially greater than the predetermined band of audio signals;
   b. first bandpass filter means having an input connected to the output of said discriminator and an output, said first bandpass filter means being designed to pass a band of frequencies within the bandpass of said discriminator means and generally outside the predetermined band of audio signals;
   c. second bandpass filter means having an input connected to the output of said discriminator and an output, said second bandpass filter means being designed to pass a band of frequencies within the bandpass of said discriminator means and generally outside the predetermined band of audio signals, the band of frequencies passed by said second bandpass filter means being adjacent and generally outside the band of frequencies passed by said first bandpass filter means; and
   d. selector circuit means connected to the outputs of said first and second bandpass filter means for selecting, as an indication of the strength of signals being received by the radio receiver, the output having the lowest amplitude signal thereon.

2. Signal quality detector means as claimed in claim 1 wherein the bands of frequencies passed by the first and second bandpass filter means are higher in frequency than the predetermined band of audio signals.

3. Signal quality detector means as claimed in claim 1 wherein the radio receiver is designed to receive tone frequencies and the combined bandwidth of the first and second bandpass filter means is less than the bandwidth from zero to the lowest tone frequency to be received.

4. Signal quality detector means as claimed in claim 1 wherein the selector circuit means includes first and second peak detectors coupled, respectively, to the first and second bandpass filter means for supplying output signals which increase with increased signal inputs.

5. Signal quality detector means as claimed in claim 4 wherein the selector circuit includes in addition first and second transistors coupled, respectively, to the first and second peak detectors and to a storage capacitor for varying a charge stored in said capacitor in inverse proportion to the amount of signal supplied to said first and second transistors by said first and second peak detectors, the charge stored in said storage capacitor being the output signal indicative of the strength of signals being received by the radio receiver.

6. Signal quality detector means as claimed in claim 5 wherein the selector circuit includes in addition first and second diodes coupling signals from the first and second transistors to the storage capacitor, respectively; and connected to be reverse biased when the conduction of the first and second transistors reach predetermined values for switching control of the charge stored in said storage capacitor to the transistor conducting below the predetermined value.

7. Signal quality detector means for use in a tone signalling system with an FM radio designed to pass a predetermined band of signals and including a discriminator with a bandpass substantially greater than the predetermined band of signals, said detector means comprising:
 a. first bandpass filter means having an input connected to the output of the discriminator and an output, said first bandpass filter means being designed to pass a band of frequencies within the bandpass of the discriminator and generally higher than the predetermined band of signals;
 b. second bandpass filter means having an input connected to the output of the discriminator and an output, said second bandpass filter means being designed to pass a band of frequencies within the bandpass of the discriminator and generally higher than the predetermined band of signals, the band of frequencies passed by said second bandpass filter means being adjacent and generally outside the band of frequencies passed by said first bandpass filter means;
 c. said first and second bandpass filter means being further constructed so that the combined bandpass thereof is less than the bandwidth between the lowest tone used in the tone signalling system and the first harmonic thereof; and
 d. selector circuit means connected to the outputs of said first and second bandpass filter means for selecting, as an indication of the strength of signals being received by the radio receiver, the output having the lowest amplitude signal thereon.

* * * * *